United States Patent [19]

Pulliainen et al.

[11] Patent Number: 5,062,932
[45] Date of Patent: Nov. 5, 1991

[54] PROCEDURE AND MEANS FOR SEPARATING PLASTIC PARTICLES ELECTRICALLY FROM SOLUTIONS, IN PARTICULAR FROM CELLULOSE AND PAPER FIBRE SOLUTIONS

[75] Inventors: Martti Pulliainen, Anttola; Hannu Savisalo, Mikkeli, both of Finland; Markku Ainali, Västerås, Sweden

[73] Assignee: Savcor-Consulting Oy, Finland

[21] Appl. No.: 504,554

[22] Filed: Apr. 3, 1990

[51] Int. Cl.$^5$ .............................................. C02F 1/46
[52] U.S. Cl. .................................... 204/130; 204/149; 204/231
[58] Field of Search .................... 204/130, 149, 231

[56] References Cited

FOREIGN PATENT DOCUMENTS 5033238  3/1974  Japan.

Primary Examiner—T. M. Tufariello
Attorney, Agent, or Firm—Steinberg & Raskin

[57] ABSTRACT

Plastic particles are separated from liquid mediums having the same distributed therethrough, in particular cellulose and paper fiber-containing mediums by electrolytic separation. The liquid medium is introduced into a container provided with an anode, a cathode and a reference electrode, with the plastic particles being separated from the liquid medium by controlling the potential of the anode and the cathode so that the potential of the anode is at most 2800 mV S.C.E., preferably +1200 to −300 mV S.C.E., and the potential of the cathode is at least −3500 mV S.C.E., preferably from +120 to −2100 mV S.C.E. The control of the potentials of the electrodes is effected to such ranges that gas production is selectively provided on the electrodes for cleaning thereof.

13 Claims, 2 Drawing Sheets

PROCEDURE AND MEANS FOR SEPARATING PLASTIC PARTICLES ELECTRICALLY FROM SOLUTIONS, IN PARTICULAR FROM CELLULOSE AND PAPER FIBRE SOLUTIONS

BACKGROUND OF THE INVENTION

Plastic particles are present as harmful substances in various liquid mediums such as those containing cellulose. The separation of these plastic particles from the liquid is very difficult.

Electrical procedures for the removal of harmful plastic particles have been used primarily only in connection with some clarification procedures of waste water, floatation and in connection with certain plastic testing procedures. Such electrical procedures have not been used for the removal of plastic from among cellulose fibers. Instead, the removal of plastic from liquids containing cellulose fibers has in the past been accomplished primarily based on the density of the plastic, either in a liquid phase or by centrifugal procedures.

SUMMARY OF THE INVENTION

In accordance with the present invention, plastic particles are electrically separated from liquids containing the same and also containing cellulose particles and/or paper fibers.

It is a primary object of the present invention to provide a method which permits the separation of plastic particles from liquid mediums containing cellulose particles and/or paper fibers.

It is another object of the present invention to provide electrical means for accomplishing this method.

Other objects and advantages of the present invention will be apparent from a further reading of the specification and of the appended claims.

The electrical conductivity of plastic is in general poor because plastics are insulating materials. The surface resistance of plastics varies within the range of $10^{10}$ to $10^{16}$ $\phi$, as a result of which the adhesion properties of the plastics are poor and moisting of the same is difficult. Because of the poor electrical conductivity, local charged areas are left in plastics in general as a result of working, abrasion and other treatment. Still further, the mobility of electrons in plastics is poor as a result of which the potential differences in different parts of the product are not able to discharge.

Plastics constitute an electrical voltage series of their own, which is presented roughly in Table 1 below:

TABLE 1.

| Triboelectric Series |
|---|
| + Rabbit hair |
| Bakelite |
| Cellulose acetate |
| Glass |
| Quartz |
| Hair |
| Wool |
| Nylon 6 |
| Nylon 66 |
| Cat hair |
| Viscose |
| Cotton |
| Leather |
| Wood |
| Paper |
| Amber |
| Metals |
| PVC |
| Ebonite |

TABLE 1.-continued

| Triboelectric Series |
|---|
| Polystyrene |
| Polyethene |
| Teflon |
| − Cellulose nitrate |

Thus, it is still a further objection of the present invention to remove harmful plastic particles electrically from liquid mediums containing the same The method and means of the invention is mainly characterized in the separation of plastic particles present in a liquid medium containing the same, particularly liquid mediums also containing cellulose particles and/or papers fibers, by inserting an anode, a cathode and a reference electrode into the liquid, and controlling the potential of the anode and the cathode so that the potential of the anode is at most 2800 mV S.C.E. preferably +1200 to −300 mV S.C.E. or the potential of the cathode is at least −3500 mV S.C.E., preferably +120 to +2100 mV S.C.E.

BRIEF DESCRIPTION OF THE DRAWINGS

The invention is further illustrated in connection with the accompanying drawings, in which.

DESCRIPTION OF PREFERRED EMBODIMENTS

In accordance with the method of the present invention, a liquid medium containing undesired plastic particles is passed between two electrodes. The harmful plastic particles thus adhere to one of the electrodes. The electrode potential used to achieve adherence of the plastic to the electrode depends on the type of plastic. However, in all cases, the potential of the anode should not be greater than 2800 mV S.C.E., or the potential of the cathode must be at least −3500 mV S.C.E.

In accordance with a further embodiment of the present invention, the potential of the electrodes is controlled in such manner as to selectively produce gas at the electrodes.

Figure 1:
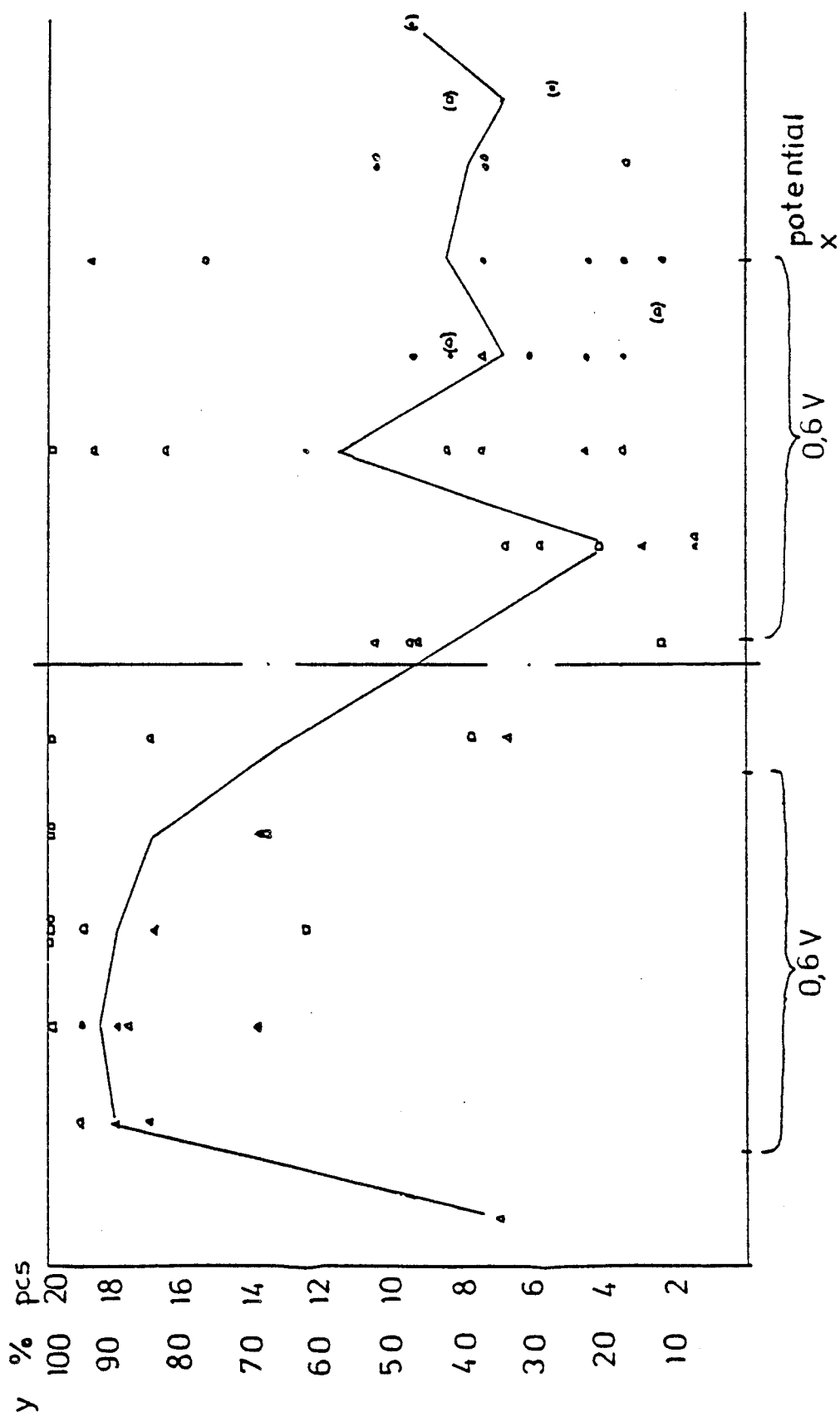
FIG. 1 is a graph of series of tests utilizing the process of the present invention.

FIG. 1 sets forth the results of a series of tests following the process of the present invention. In the tests series, stainless steel was used for the cathode material, and the plastic particles were distributed in an aqueous solution. A buoyancy angle of 45° was used in the test series. The X axis in the figure depicts the potential, and the Y axis, the number of plastic particles which adhered to an electrode, as well as the percentage of the particles which adhere to the electrode with respect to the total number of particles in the solution.

The graph confirms that at certain values of the potential, almost all plastic particles adhered to the electrode, The following markings were used in FIG. 1 for the various tests:

Test 52-69
70-77
78-91
92-114

The most suitable material for the electrode in carrying out the process of the present invention is stainless CrNi steel, an aluminum mixture, or metallic copper. In addition, electrode made from inert metals or coated therewith can be used for the process of the present invention. Still further, the electrode material may be graphite or carbon fiber.

In those situations in which the liquid medium flows, the electrodes are installed in an optimum position and should have an optimum configuration selected from the particular conditions, for example, lamella, reticular or plate-like configuration.

Figure 2:
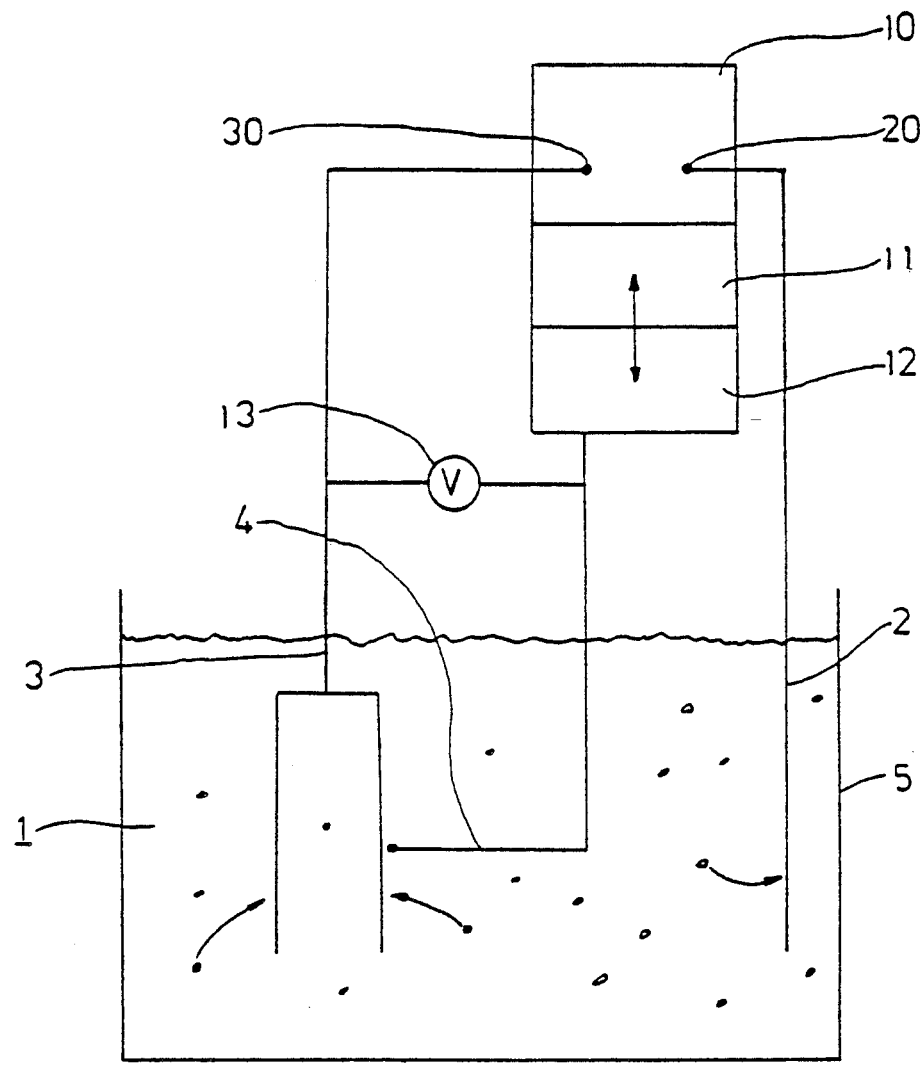
FIG. 2 is a schematic illustration of the apparatus of the present invention.

FIG. 2 diagrammatically illustrates a device for carrying out the process of the present invention. As shown therein, the liquid substance 1 containing plastic particles distributed therethrough is placed in a container 5 or the like. By means of a power supply 10, a voltage is provided through poles 20 and 30 to electrode 2 and 3, respectively. When the neccesary potential difference exists between the electrodes 2 and 3, the particles adhere to the electrode provided with the appropriate potential. With the aid of a reference electrode 4, the potential of the other electrode is monitored and the information is transmitted to a data unit 12, which in turn transmits the measuring results to a conclusion unit 11. The conclusion unit 11 controls the functioning of the power source 10 so that the requisite potentials on both of the electrodes are appropriately maintained. A voltmeter 13 is connected to one of the electrodes for the monitoring of the voltage of the electrode.

In the device of the invention, the cleaning of the electrodes 2 and 3 can be carried out by so controlling the potential between the electrodes, that vigorous gas formation takes place on the electrodes. This potential differs considerably from the potential used in the separation process.

While the invention has been described with respect to a particular embodiment thereof, it is apparent that variations and modifications thereof can be made, and the invention is not meant to be limited to the specific details of the embodiment disclosed.

What is claimed is:

1. Method of separating plastic particles from a liquid medium in which the same are distributed, which comprises subjecting said liquid medium containing said plastic particles in a container provided with an anode, a cathode and a reference electrode to electrolytic separation by controlling the potential of the anode and the cathode such that the potential of the anode is at most 2800 mV S.C.V., or the potential of the cathode is at least −3500 mV S.C.V.

2. Method according to claim 1 wherein said liquid medium contains cellulose or paper fibers therein.

3. Method according to claim 2 wherein the potentials of the electrode is increased to a value at which gas production selectively occurs at the electrodes.

4. Method according to claim 2 wherein the potential of the anode is between +1200 to −300 mV S.C.E. or the potential of the cathode is between about −120 to −1200 mV S.C.E.

5. Method according to claim 2 wherein at least one of the electrodes resembles a lamella.

6. Method according to claim 2 wherein at least one of the electrodes is reticular.

7. Method according to claim 2 wherein at least one of the electrodes has a plate-like figuration.

8. Method according to claim 2 wherein the material of the electrodes is at least partly stainless CrNi steel.

9. Method according to claim 2 wherein the electrodes are formed at least partly of aluminum.

10. Method according to claim 2 wherein the electrodes are formed at least partly of copper.

11. Method according to claim 2 wherein the electrodes are formed of graphite or carbon fiber.

12. Apparatus for carrying out the electrolytic separation of plastic particles from a liquid medium having the same distributed therethrough, comprising a container for the liquid medium, an anode, a cathode and a reference electrode in said container and means for controlling the potential of the anode and the cathode such that the potential of the anode is at most 2800 mV S.C.E., or the potential of the cathode is at least −3500 mV S.C.E.

13. Apparatus according to claim 12, and further comprising means for controlling the potential of the electrodes to effect gas production at the electrodes and thereby clean the same.

* * * * *